Dec. 17, 1946.  L. H. SNYDER  2,412,840
ECCENTRIC-SOLENOID ACTUATED SIEVE
Filed Oct. 27, 1943
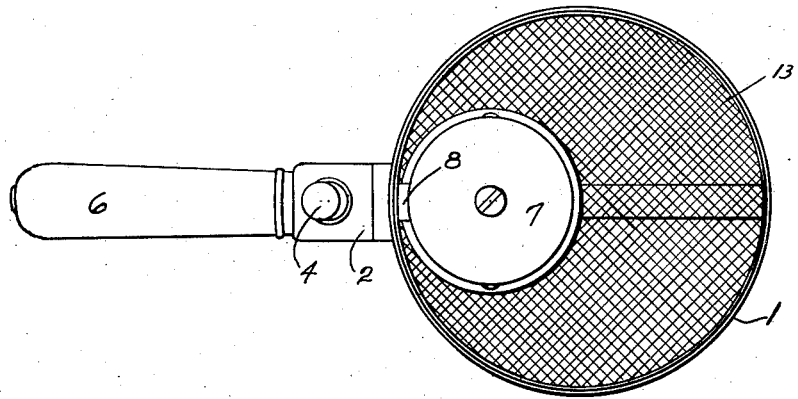
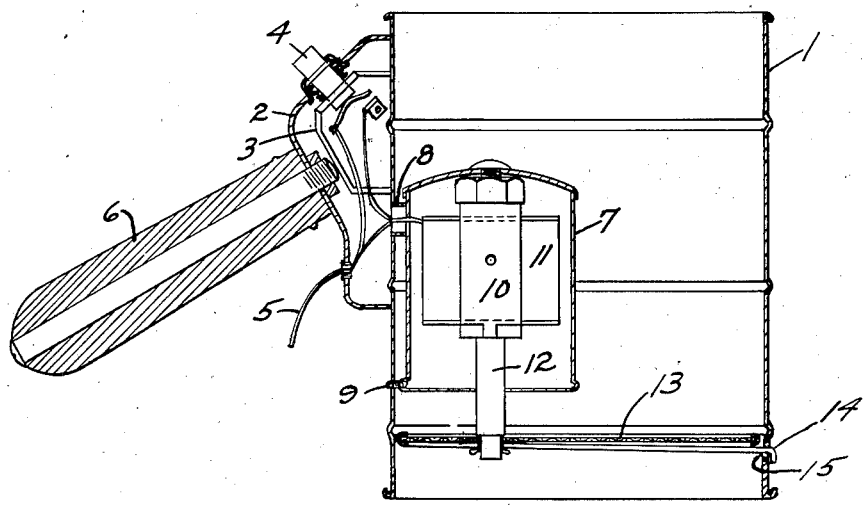
Inventor
LELAND H. SNYDER Patented Dec. 17, 1946

2,412,840

UNITED STATES PATENT OFFICE 2,412,840

ECCENTRIC-SOLENOID ACTUATED SIEVE

Leland H. Snyder, Lincolnwood, Ill., assignor, by mesne assignments, to Continental-United Industries Co., Inc., New York, N. Y., a corporation of Delaware Application October 27, 1943, Serial No. 507,799

2 Claims. (Cl. 209—347)

The present invention pertains to a sieve and more particularly to a portable type of domestic kitchen flour sieve of an electrically operated type including a solenoid control which is eccentrically mounted and eccentrically connected with the sieve screen in such a way that the efficiency of the sieve is increased.

It is an object of this invention to provide an improved and simplified form of electrically operated portable domestic sieve which is designed and constructed with improvements for increasing the adaptability and efficiency thereof.

It is also an object of this invention to provide an improved and simplified type of electrically operated sieve wherein a vibration producing unit is eccentrically connected with the sieve screen whereby a wave-like whipping motion is imparted to the screen for effecting a more efficient operation of the sieve.

It is a further object of this invention to provide an improved and simplified form of an electric sieve whereby the efficiency of the sieve screen is increased by eccentrically applying a vibratory motion thereto to produce a combination undulatory and whipping motion to the screen and thereby increasing the efficiency of the sieve.

It is furthermore an object of this invention to provide a portable type of electric sieve for sifting flour and the like, said sieve including a solenoid unit having a screen eccentrically connected thereto and supported thereby to receive a vibratory motion therefrom to cause the screen to be actuated with a wave-like or whipping motion to increase the sifting action of the sieve.

It is an important object of this invention to provide an improved and simplified type of electric kitchen sieve wherein an electric solenoid has the plunger or core thereof eccentrically attached to and carrying a screen to produce a whipping motion thereto while a portion of the screen is limited in its movement by movable engagement with the sieve housing.

Other objects and features of the invention will be apparent from the disclosures in the specification and the appended drawing which illustrate a selected embodiment of the invention.

In the drawing:

Figure 1 is a top plan view of an improved sieve embodying the principles of this invention.

Figure 2 is a central vertical sectional view of the sieve with parts shown in elevation.

As shown in the drawing:

This invention relates to a sieve and more particularly to a portable type of kitchen sieve for sifting flour and the like. The sieve of this invention is of the electrically operated type wherein a sifting screen is eccentrically connected to a vibration transmitting means to produce a sort of whipping or undulatory movement in the screen to increase the sifting operation thereof.

As shown in the drawing, the reference numeral 1 indicates a cylindrical can or casing constructed of tin or other suitable material and open at both ends. Secured to one side near the upper portion of the exterior of the casing 1 is a switch housing 2 containing an electric switch mechanism designated as a whole by the reference numeral 3. The electric switch mechanism 3 is adapted to be operated by means of a push-button 4 which is of the spring controlled type and which, when depressed, causes closing of the switch contacts. Connected with the switch mechanism is an electric cord 5 on the outer end of which an electric plug (not shown) is adapted to be carried in order to permit the cord to be connected up with a suitable sort of electrical energy when the plug is engaged into an electric socket. Secured to the housing 2 is a handle 6 for holding the sieve when the same is being used.

A plunger type of solenoid mechanism is mounted eccentrically within the sieve casing 1 and in the lower portion thereof adjacent the inner side of the wall having the housing 2 secured on the exterior thereof. The solenoid mechanism comprises a housing or casing 7 closed at the top and bottom and constructed of metal or other suitable material. Rigidly connecting the upper portion of the solenoid housing 7 to the wall of the sieve casing 1 is a tubular bracket 8 through which the wires from the cord 5 project. The lower portion of the solenoid housing 7 is also secured to the sieve casing 1 by means of a screw 9.

Supported in the solenoid housing 7 is a supporting frame 10 in which a solenoid coil 11 is supported. Mounted within the solenoid coil 11 is a solenoid core or plunger 12 which projects downwardly through an opening in the bottom of the solenoid housing 7. The lower end of the solenoid plunger is eccentrically connected to a sieve screen 13 so that when the solenoid is operated the vibratory motions from the solenoid plunger 12 are transmitted to the screen 13 to produce whipping or undulatory movements of the screen to cause the rapid and efficient sifting of the flour or other contents of the sieve through the screen out through the bottom of the sieve.

It will thus be noted that by eccentrically connecting the solenoid plunger to the screen that the edge or margin of the screen farthest from the plunger 12 is given the widest range of whipping or undulatory movement. In order to limit the upward and downward movement of the screen at the point farthest from the solenoid plunger, and also to act as a support for said portion of the screen when carrying a load, a hook-shaped finger or extension 14 is formed on one end of a metal strip diametrically secured across the bottom of the screen. The hooked outer end 14 of said strip projects through a guide slot 15 which is formed in the lower portion of the sieve casing 1. The slot 15 also serves as a means for preventing rotative movement of the screen.

The operation of the device is simple, merely requiring that the flour or other material which is to be sifted is deposited in the top of the sieve casing 1 upon the screen. If the weight of the material is sufficient to deflect the margin of the screen farthest from the eccentric support, the end 14 of the diametric strip projecting through the slot 15 in the casing will serve as a support to prevent too great a deflection to permit the material to pass out of the bottom of the sieve casing between the screen and the casing. With a quantity of the material deposited in the casing the person operating the device merely holds the same by the handle 6 and depresses the control switch button 4 to close the contacts of the switch mechanism 3 thereby permitting the electrical energy received through the cord 5 to operate the solenoid coil 11 and the solenoid plunger or core 12. Operation of the solenoid plunger 12, which is eccentrically connected to the screen 13, causes a whipping or undulatory movement to be imparted to the screen, the movement of which is limited by the finger piece 14 moving in the guide slot 15.

The eccentric mounting of the solenoid and the sieve screen 13 permits different degrees of movement to be imparted to different parts of the screen depending upon the distance of the parts from the plunger. The eccentric supporting of the screen and the undulatory motion imparted thereto tends to more quickly and thoroughly sift the flour or material through the screen.

It will, of course, be understood that various details of construction may be varied through a wide range without departing from the principles of this invention, and it is therefore, not the purpose to limit the patent granted hereon, otherwise than necessitated by the scope of the appended claims.

I claim as my invention:

1. A portable type sieve comprising a cylindrical casing, a handle unit connected with the casing, a solenoid supported eccentrically in said casing on one side wall thereof, a plunger forming part of the solenoid and operable thereby, a screen eccentrically supported on the plunger within the casing, a strip secured diametrically across the screen and having one end only thereof coacting with the casing for limiting the movement of the screen, said strip having the opposite end secured to the periphery of the screen at a point thereon nearest the plunger, an electric cord connected with the solenoid for delivering electrical energy thereto for operating the solenoid, and a switch connected with the cord and with the solenoid for governing the operation of the solenoid to cause the plunger to transmit an undulatory movement to the eccentrically mounted screen.

2. A portable type of sieve for sifting flour and the like, said sieve comprising a casing, a handle mechanism connected to the casing, a solenoid eccentrically mounted in the casing, an electric cord connected with the solenoid, a switch in said cord for governing the operation of the solenoid, a plunger operable by the solenoid, a screen eccentrically connected at one point only to the plunger and supported thereby to cause an undulatory whipping movement to be imparted to the screen, and a diametric member having one end connected with the periphery of the screen and having the opposite end coacting at one side only with the casing to be supported thereby when loaded and for limiting the movement of the screen when the same is actuated to cause sifting.

LELAND H. SNYDER.